United States Patent
Burch et al.

(10) Patent No.: US 10,127,444 B1
(45) Date of Patent: Nov. 13, 2018

(54) SYSTEMS AND METHODS FOR AUTOMATICALLY IDENTIFYING DOCUMENT INFORMATION

(71) Applicant: Coupa Software Incorporated, San Mateo, CA (US)

(72) Inventors: Mark Oliver Burch, South Turramurra (AU); Hanieh Borhanazad, Greenwich (AU)

(73) Assignee: Coupa Software Incorporated, San Mateo, CA (US)

( * ) Notice: Subject to any disclaimer, the term of this patent is extended or adjusted under 35 U.S.C. 154(b) by 41 days.

(21) Appl. No.: 15/454,987

(22) Filed: Mar. 9, 2017

(51) Int. Cl.
*G06K 9/00* (2006.01)

(52) U.S. Cl.
CPC ..... *G06K 9/00483* (2013.01); *G06K 9/00463* (2013.01); *G06K 9/00469* (2013.01)

(58) Field of Classification Search
CPC ............ G06K 9/00456; G06K 9/6267; G06K 9/00483; G06K 9/00463; G06K 9/00469
See application file for complete search history.

(56) References Cited

U.S. PATENT DOCUMENTS

| | | | | |
|---|---|---|---|---|
| 7,246,312 B2 * | 7/2007 | Harnngton | ............. | G06Q 10/04 715/255 |
| 7,310,600 B1 * | 12/2007 | Garner | .................... | G10L 15/12 704/234 |
| 7,359,851 B2 * | 4/2008 | Tong | ..................... | G06F 17/218 704/8 |
| 7,948,649 B2 * | 5/2011 | Kim | ..................... | H04N 1/2104 358/1.16 |
| 8,811,742 B2 * | 8/2014 | Petrou | ............... | G06F 17/30253 382/187 |
| 9,008,443 B2 * | 4/2015 | Dejean | ............... | G06K 9/00463 382/203 |
| 9,613,267 B2 * | 4/2017 | Dejean | ............... | G06K 9/00449 |
| 2004/0098246 A1 * | 5/2004 | Welch | ................. | G06F 17/2229 704/3 |
| 2006/0262351 A1 * | 11/2006 | Kim | ..................... | H04N 1/2104 358/1.16 |
| 2007/0116362 A1 * | 5/2007 | Tiede | ................. | G06K 9/00463 382/181 |

(Continued)

*Primary Examiner* — Maikhanh Nguyen
(74) *Attorney, Agent, or Firm* — Hickman Palermo Becker Bingham LLP

(57) ABSTRACT

Described herein is a computer implemented method for processing an electronic document. The method comprises accessing a comparison set of reference document codifications, each reference document codification in the comparison set comprising a plurality of canonical feature codifications. Each canonical feature codification in each reference document codification in the comparison set is processed by determining whether the electronic document has one or more text rectangles in a potential position of the canonical feature and, in response determining that the electronic document has one or more text rectangles in a potential position of the canonical feature, recording a preliminary association between the or each text rectangle and the canonical feature. For each text rectangle preliminarily associated with one or more canonical features, a final canonical feature assignment is determined for the text rectangle based on the one or more preliminarily associated canonical features.

18 Claims, 9 Drawing Sheets

(56) References Cited

U.S. PATENT DOCUMENTS

2011/0264672 A1* 10/2011 Gipp ................ G06F 17/30728
707/749
2013/0251211 A1* 9/2013 Palm ................. G06K 9/00456
382/112
2013/0343658 A1* 12/2013 Dejean ............... G06K 9/00463
382/203
2016/0063322 A1* 3/2016 Dejean ............... G06K 9/00449
382/176

* cited by examiner

200

202 [Density, height, width, zero-point x-coordinate, zero-point x-coordinate,

204 XT.L2, YT.L2, XB.L2, YB.L2, FT.L2, FS.L2, XT.D2, YT.D2, XB.D2,
YB.D2, FT.D2, FS.D2, E2, CX.L2, CY.L2, CX.D2, CY.D2, DX2, DY2, XT2,
YT2, XB2, YB2, DT.D2, FW.D2, FW.L2,

206 XT.L3, YT.L3, XB.L3, YB.L3, FT.L3, FS.L3, XT.D3, YT.D3, XB.D3,
YB.D3, FT.D3, FS.D3, E3, CX.L3, CY.L3, CX.D3, CY.D3, DX3, DY3, XT3,
YT3, XB3, YB3, DT.D3, FW.D3, FW.L3,

208 XT.L4, YT.L4, XB.L4, YB.L4, FT.L4, FS.L4, XT.D4, YT.D4, XB.D4,
YB.D4, FT.D4, FS.D4, E4, CX.L4, CY.L4, CX.D4, CY.D4, DX4, DY4, XT4,
YT4, XB4, YB4, DT.D4, FW.D4, FW.L4,

...

210 XT.Ln, YT.Ln, XB.Ln, YB.Ln, FT.Ln, FS.Ln, XT.Dn, YT.Dn, XB.Dn,
YB.Dn, FT.Dn, FS.Dn, En, CX.Ln, CY.Ln, CX.Dn, CY.Dn, DXn, DYn, XTn,
YTn, XBn, YBn, DT.Dn, FW.Dn, FW.Ln]

202 [1, 792, 612, 40, 36, 204 362, 157, 413, 168, 2, 9, 493, 157, 573,
168, 2, 9, 3, 387, 163, 533, 163, 131, 0, 362,
157, 573, 168, 7, 2, 2, 206 xxx, xxx, xxx, xxx, xxx, xxx, xxx, xxx, xxx,
xxx, xxx, xxx, xxx, xxx, xxx, xxx, xxx, xxx, xxx, xxx,
xxx, xxx, xxx, xxx, xxx, xxx, 208 xxx, xxx, xxx, xxx, xxx, xxx, xxx, xxx, xxx,
xxx, xxx, xxx, xxx, xxx, xxx, xxx, xxx, xxx, xxx, xxx,
xxx, xxx, xxx, xxx, xxx, xxx,

...

210 xxx, xxx, xxx, xxx, xxx, xxx, xxx, xxx, xxx,
xxx, xxx, xxx, xxx, xxx, xxx, xxx, xxx, xxx, xxx, xxx,
xxx, xxx, xxx, xxx, xxx, xxx]

Figure 2B

| ID | D'ty | H'ht | W'th | ZP ZX | ZP ZY | XT. L2 | YT. L2 | XB. L2 | YB. L2 | FT. L2 | FS. L2 | XT. L2 | YT. L2 | XB. L2 | YB. L2 | FT. D2 | FS. D2 | EZ | CX L2 | CY L2 | CX D2 | CY D2 | DX | DY | XT. 2 | YT. 2 | XB. 2 | YB. 2 | DT. D2 |
|---|---|---|---|---|---|---|---|---|---|---|---|---|---|---|---|---|---|---|---|---|---|---|---|---|---|---|---|---|---|
| 001 | 5 | 792 | 612 | 36 | 27 | 375 | 218 | 429 | 227 | 8 | 9 | 539 | 218 | 575 | 227 | 8 | 9 | 3 | 402 | 222 | 557 | 223 | 164 | 0 | 375 | 218 | 575 | 227 | 5 |
| 002 | 3 | 842 | 595 | 28 | 74 | 339 | 74 | 393 | 84 | 14 | 10 | 339 | 85 | 390 | 95 | 14 | 10 | 3 | 366 | 79 | 364 | 90 | 0 | 11 | 339 | 74 | 393 | 95 | 7 |
| 003 | 3 | 595 | 842 | 24 | 22 | 42 | 190 | 63 | 200 | 8 | 9 | 34 | 203 | 70 | 212 | 8 | 9 | 3 | 52 | 195 | 52 | 207 | -8 | 12 | 34 | 190 | 70 | 212 | 5 |
| 004 | 4 | 595 | 842 | 47 | 43 | 499 | 85 | 559 | 95 | 8 | 10 | 587 | 85 | 633 | 95 | 8 | 10 | 3 | 529 | 90 | 610 | 90 | 88 | -1 | 499 | 85 | 633 | 95 | 5 |
| 005 | 3 | 596 | 848 | 34 | 31 | 649 | 132 | 669 | 140 | 10 | 8 | 678 | 133 | 710 | 141 | 10 | 8 | 3 | 659 | 136 | 694 | 137 | 28 | 1 | 649 | 132 | 710 | 141 | 5 |
| 006 | 3 | 842 | 595 | 21 | 143 | 149 | 285 | 175 | 296 | 4 | 11 | 296 | 285 | 421 | 296 | 4 | 11 | 3 | 162 | 291 | 358 | 291 | 147 | 0 | 149 | 285 | 421 | 296 | 4 |
| 007 | 2 | 842 | 595 | 52 | 129 | 52 | 143 | 76 | 152 | 10 | 9 | 137 | 143 | 193 | 152 | 10 | 9 | 3 | 64 | 148 | 358 | 148 | 85 | 0 | 52 | 143 | 193 | 152 | 5 |
| 008 | 1 | 792 | 612 | 67 | 131 | 321 | 152 | 345 | 161 | 2 | 7 | 391 | 150 | 452 | 159 | 2 | 7 | 3 | 333 | 157 | 421 | 154 | 70 | -2 | 321 | 150 | 452 | 161 | 2 |
| 009 | 4 | 842 | 595 | 72 | 146 | 0 | 0 | 0 | 0 | 0 | 0 | 503 | 186 | 509 | 194 | 3 | 7 | 2 | 0 | 0 | 506 | 190 | 0 | 0 | 0 | 0 | 0 | 0 | 5 |
| 010 | 3 | 842 | 595 | 39 | 40 | 370 | 82 | 390 | 91 | 8 | 9 | 466 | 82 | 507 | 91 | 8 | 9 | 3 | 380 | 86 | 486 | 86 | 96 | 0 | 370 | 82 | 507 | 91 | 5 |
| 011 | 3 | 842 | 595 | 28 | 116 | 0 | 0 | 0 | 0 | 0 | 0 | 351 | 126 | 392 | 136 | 4 | 9 | 3 | 0 | 0 | 371 | 131 | 0 | 0 | 0 | 0 | 0 | 0 | 7 |
| 012 | 4 | 791 | 609 | 21 | 21 | 440 | 51 | 465 | 59 | 8 | 8 | 509 | 51 | 556 | 59 | 8 | 8 | 2 | 452 | 55 | 533 | 55 | 70 | 0 | 440 | 51 | 556 | 59 | 5 |
| 013 | 6 | 842 | 595 | 21 | 31 | 0 | 0 | 0 | 0 | 0 | 0 | 472 | 82 | 512 | 90 | 2 | 8 | 2 | 0 | 0 | 492 | 86 | 0 | 0 | 0 | 0 | 0 | 0 | 5 |
| 014 | 6 | 841 | 600 | 23 | 28 | 0 | 0 | 0 | 0 | 0 | 0 | 23 | 804 | 115 | 811 | 10 | 10 | 3 | 0 | 0 | 69 | 808 | 0 | 0 | 0 | 0 | 0 | 0 | 6 |
| 015 | 8 | 792 | 612 | 41 | 30 | 385 | 93 | 454 | 102 | 10 | 9 | 464 | 93 | 519 | 102 | 10 | 9 | 3 | 420 | 97 | 491 | 97 | 79 | 0 | 385 | 93 | 519 | 102 | 5 |
| 016 | 2 | 842 | 595 | 54 | 110 | 58 | 112 | 83 | 122 | 8 | 10 | 111 | 112 | 150 | 122 | 8 | 10 | 3 | 70 | 117 | 130 | 117 | 53 | 0 | 58 | 112 | 150 | 122 | 7 |
| 017 | 6 | 792 | 612 | 36 | 15 | 388 | 41 | 448 | 50 | 10 | 10 | 500 | 40 | 559 | 49 | 10 | 10 | 3 | 418 | 45 | 529 | 44 | 112 | -1 | 388 | 40 | 559 | 50 | 2 |
| 018 | 9 | 842 | 595 | 20 | 2 | 0 | 0 | 0 | 0 | 0 | 0 | 19 | 722 | 70 | 734 | 2 | 10 | 2 | 0 | 0 | 45 | 728 | 0 | 0 | 0 | 0 | 0 | 0 | 5 |
| 019 | 3 | 842 | 595 | 28 | 32 | 32 | 147 | 79 | 154 | 8 | 8 | 167 | 147 | 208 | 154 | 8 | 8 | 3 | 56 | 150 | 188 | 150 | 135 | 0 | 32 | 147 | 208 | 154 | 7 |
| 020 | 3 | 792 | 612 | 72 | 74 | 390 | 244 | 415 | 254 | 10 | 10 | 438 | 244 | 483 | 254 | 10 | 10 | 3 | 402 | 249 | 460 | 249 | 48 | 0 | 390 | 244 | 483 | 254 | 7 |
| 021 | 9 | 792 | 612 | 23 | 20 | 470 | 580 | 491 | 586 | 2 | 8 | 494 | 570 | 561 | 582 | 2 | 8 | 3 | 480 | 583 | 527 | 576 | 23 | -4 | 470 | 570 | 561 | 586 | 7 |
| 022 | 7 | 842 | 595 | 72 | 52 | 344 | 117 | 402 | 128 | 4 | 11 | 344 | 130 | 399 | 141 | 4 | 11 | 3 | 373 | 122 | 371 | 136 | 0 | 13 | 344 | 117 | 402 | 141 | 7 |
| ... | ... | ... | ... | ... | ... | ... | ... | ... | ... | ... | ... | ... | ... | ... | ... | ... | ... | ... | ... | ... | ... | ... | ... | ... | ... | ... | ... | ... | ... |
| n | x | x | x | x | x | x | x | x | x | x | x | x | x | x | x | x | x | x | x | x | x | x | x | x | x | x | x | x | x |

| Ref | XT.L2 | YT.L2 | XB.L2 | YB.L2 | FT.L2 | FS.L2 | XT.D2 | YT.D2 | XB.D2 | YB.D2 | FT.D2 | FS.D2 | E2 | CXL2 | CYL2 | CXD2 | CYD2 | DX2 | DY2 | DT.D2 | FW.D2 | FW.L2 |
|---|---|---|---|---|---|---|---|---|---|---|---|---|---|---|---|---|---|---|---|---|---|---|
| 001 | 398 | 149 | 448 | 158 | 3 | 9 | 449 | 149 | 496 | 158 | 3 | 9 | 3 | 423 | 154 | 473 | 154 | 51 | 0 | 4 | 2 | 1 |
| 002 | 270 | 129 | 317 | 139 | 3 | 9 | 270 | 140 | 316 | 150 | 3 | 9 | 3 | 294 | 134 | 293 | 145 | 0 | 11 | 4 | 2 | 1 |
| 003 | 351 | 116 | 398 | 125 | 3 | 9 | 351 | 126 | 398 | 136 | 3 | 9 | 3 | 375 | 120 | 374 | 131 | 0 | 11 | 4 | 2 | 1 |
| 004 | 409 | 104 | 463 | 113 | 3 | 9 | 467 | 104 | 503 | 113 | 3 | 9 | 3 | 436 | 108 | 485 | 108 | 57 | 0 | 5 | 2 | 2 |
| 005 | 0 | 0 | 0 | 0 | 0 | 0 | 511 | 110 | 558 | 120 | 3 | 9 | 2 | 0 | 0 | 534 | 115 | 0 | 0 | 5 | 2 | 0 |
| 006 | 351 | 116 | 398 | 125 | 3 | 9 | 351 | 126 | 396 | 136 | 3 | 9 | 3 | 375 | 120 | 374 | 131 | 0 | 11 | 4 | 2 | 1 |
| 007 | 664 | 77 | 718 | 86 | 3 | 9 | 737 | 77 | 783 | 86 | 3 | 9 | 3 | 691 | 81 | 760 | 81 | 73 | 0 | 5 | 2 | 2 |
| 008 | 333 | 102 | 352 | 112 | 3 | 9 | 333 | 115 | 382 | 125 | 3 | 9 | 3 | 343 | 107 | 357 | 120 | 2 | 14 | 4 | 2 | 2 |
| 009 | 102 | 297 | 150 | 307 | 3 | 9 | 104 | 314 | 148 | 324 | 3 | 9 | 3 | 126 | 302 | 126 | 319 | 2 | 17 | 5 | 2 | 1 |
| 010 | 387 | 206 | 410 | 216 | 3 | 9 | 505 | 206 | 551 | 216 | 3 | 9 | 3 | 399 | 211 | 528 | 211 | 118 | 0 | 5 | 2 | 2 |
| 011 | 664 | 77 | 718 | 86 | 3 | 9 | 737 | 77 | 783 | 86 | 3 | 9 | 3 | 691 | 81 | 760 | 81 | 73 | 0 | 5 | 2 | 2 |
| 012 | 414 | 72 | 470 | 82 | 3 | 9 | 490 | 73 | 540 | 83 | 4 | 9 | 3 | 442 | 77 | 515 | 78 | 75 | 1 | 7 | 2 | 2 |
| 013 | 414 | 72 | 470 | 82 | 3 | 9 | 490 | 73 | 540 | 83 | 3 | 9 | 3 | 442 | 77 | 515 | 78 | 75 | 1 | 7 | 2 | 2 |
| 014 | 351 | 117 | 408 | 128 | 3 | 10 | 351 | 129 | 409 | 140 | 3 | 10 | 3 | 379 | 123 | 380 | 135 | 0 | 12 | 4 | 2 | 2 |
| 015 | 414 | 72 | 470 | 82 | 3 | 9 | 490 | 73 | 540 | 83 | 3 | 9 | 3 | 442 | 77 | 515 | 78 | 75 | 1 | 7 | 2 | 2 |
| 016 | 351 | 116 | 398 | 125 | 3 | 9 | 351 | 126 | 393 | 136 | 3 | 9 | 3 | 375 | 120 | 372 | 131 | 0 | 11 | 4 | 2 | 1 |
| 017 | 351 | 116 | 398 | 125 | 3 | 9 | 351 | 126 | 393 | 136 | 3 | 9 | 3 | 375 | 120 | 372 | 131 | 0 | 11 | 4 | 2 | 1 |
| 018 | 508 | 102 | 528 | 111 | 4 | 9 | 508 | 118 | 554 | 127 | 4 | 9 | 3 | 518 | 106 | 531 | 122 | 0 | 16 | 5 | 2 | 2 |
| 019 | 398 | 58 | 418 | 67 | 3 | 9 | 398 | 72 | 439 | 81 | 3 | 9 | 3 | 408 | 62 | 418 | 76 | 0 | 14 | 5 | 2 | 1 |
| 020 | 322 | 297 | 382 | 308 | 3 | 11 | 460 | 297 | 514 | 308 | 3 | 11 | 3 | 352 | 302 | 487 | 302 | 138 | 0 | 4 | 2 | 2 |
| 021 | 333 | 102 | 352 | 112 | 3 | 9 | 333 | 115 | 382 | 125 | 3 | 9 | 3 | 343 | 107 | 357 | 120 | 0 | 14 | 4 | 2 | 2 |
| 022 | 333 | 102 | 352 | 112 | 3 | 9 | 333 | 115 | 382 | 125 | 3 | 9 | 3 | 343 | 107 | 357 | 120 | 0 | 14 | 4 | 2 | 2 |
| 023 | 333 | 102 | 352 | 112 | 3 | 9 | 333 | 115 | 382 | 125 | 3 | 9 | 3 | 343 | 107 | 357 | 120 | 0 | 14 | 4 | 2 | 2 |
| 024 | 333 | 102 | 352 | 112 | 3 | 9 | 333 | 115 | 382 | 125 | 3 | 9 | 3 | 343 | 107 | 357 | 120 | 0 | 11 | 4 | 2 | 1 |
| 025 | 351 | 116 | 398 | 125 | 3 | 9 | 351 | 126 | 398 | 136 | 3 | 9 | 3 | 375 | 120 | 374 | 131 | 0 | 11 | 4 | 2 | 1 |
| 026 | 351 | 116 | 398 | 125 | 3 | 9 | 351 | 126 | 398 | 136 | 3 | 9 | 3 | 375 | 120 | 374 | 131 | 0 | 11 | 4 | 2 | 1 |
| ... | | | | | | | | | | | | | | | | | | | | | | |
| 100 | 386 | 120 | 451 | 133 | 3 | 12 | 458 | 120 | 541 | 133 | 3 | 12 | 3 | 418 | 126 | 500 | 126 | 72 | 0 | 7 | 2 | 2 |

Figure 8

SYSTEMS AND METHODS FOR AUTOMATICALLY IDENTIFYING DOCUMENT INFORMATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright© 2016-2017 Coupa Software, Inc.

FIELD OF THE DISCLOSURE

The present disclosure generally relates to systems and methods for automatically identifying information in documents.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Electronic documents are pervasive in modern life. Given this, there is increasing interest and value in being able to automatically process such documents to identify information contained therein. Performing such processing, however, presents various challenges, particularly where the content included in documents and its presentation in the document can vary widely.

SUMMARY

The appended claims may serve as a summary of the invention.

BRIEF DESCRIPTION OF THE DRAWINGS

In the drawings:

FIG. 2A depicts a document codification template;

FIG. 2B depicts a document codification using the document codification template of FIG. 2A;

FIG. 3 provides an example of part of a reference set of document codifications;

FIG. 8 is an example of a set of canonical feature codifications;

DETAILED DESCRIPTION

Figure 1:
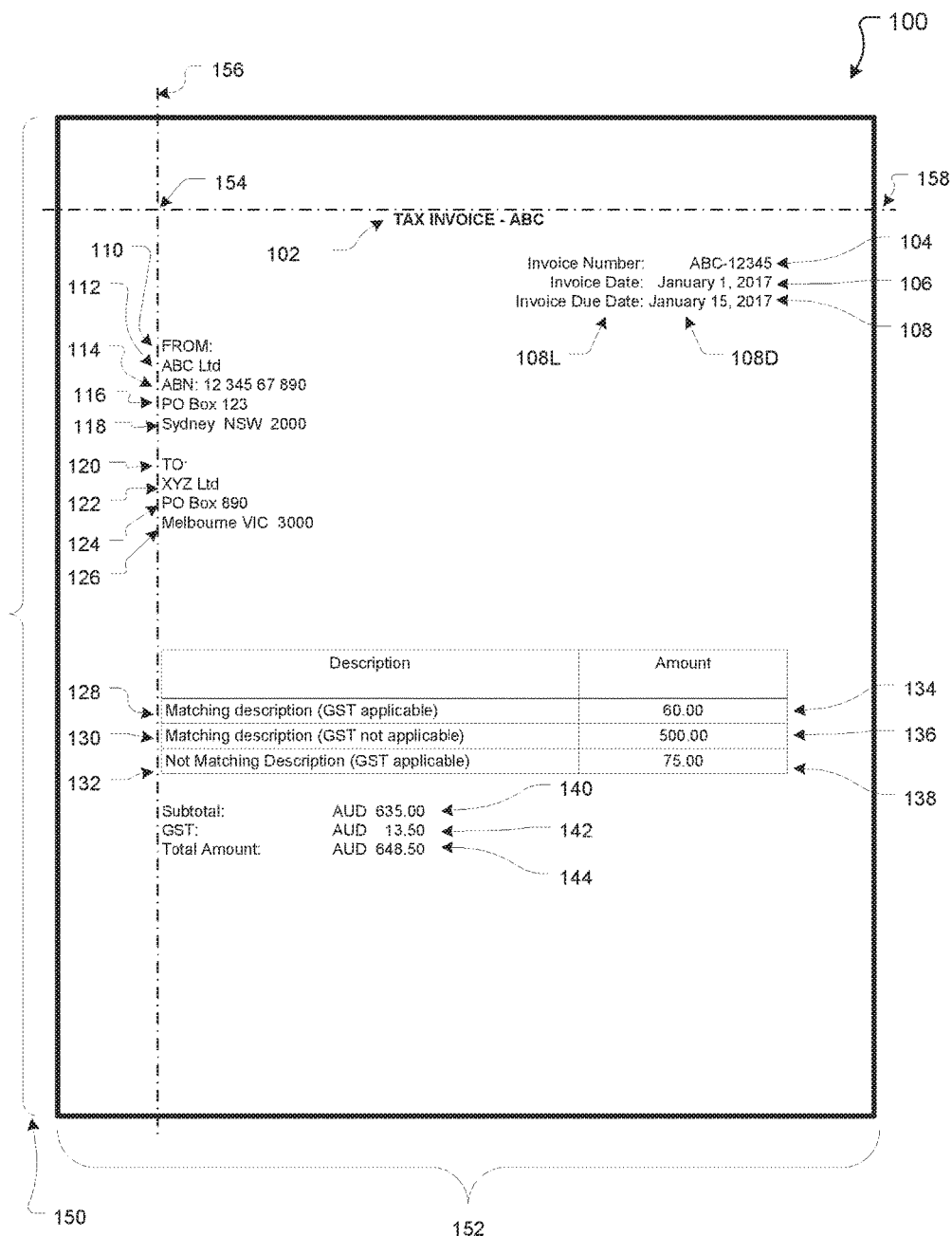
FIG. 1 illustrates an example electronic document, in particular an invoice.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessary obscuring.

Overview

The present disclosure generally relates to systems and methods for automatically identifying information from electronic documents. Once information has been identified it can be extracted to be saved and/or used for any appropriate purpose (e.g. automatic entry into another system or application).

Generally speaking, embodiments involve processing a new document to generate at least a partial numerical codification thereof. The document codification (or partial codification) is then used to identify similar codifications (of previously processed documents). Once similar document codifications have been identified, these are used to assist in the identification and extraction of information from the new document.

The systems and methods of the present disclosure are particularly useful for automatically identifying and extracting information from invoices. Accordingly, the embodiments and features will be described with respect to that exemplary but non-limiting application. The embodiments and features described herein may, however, be used to process other types of documents which are generated using templates, for example: receipts, blogs, websites, online shopping sites.

Formal requirements with respect to invoices are relatively limited. For example, while the laws of certain countries may specify that an invoice must contain certain information in order to qualify as an invoice (e.g. for tax purposes), there is no standard that prescribes the exact information content of an invoice or the form in which that information content is presented. As a result of this, invoices issued by different entities will typically share some similar items of information, but may vary widely as to the manner in which those items of information are presented and as to what additional, potentially less-common, items are also presented. This wide variation in both form and content makes automatically processing invoices to accurately identify and extract relevant information difficult.

As used herein, the term 'electronic document' (or simply document for brevity) is intended to refer to documents that are generated, stored and processed electronically and are (when rendered with appropriate software) intended to be human readable. Various electronic document formats are known and include, for example, documents with the following file-types/formats: .pdf; .doc; .rtf. The features and embodiments described herein may be applied to these and/or any other electronic document types. In one particular implementation, the processing described herein is performed on originally generated .pdf documents, which are ubiquitous in invoicing.

To provide context for the following description, FIG. 1 illustrates an example invoice 100. Invoice 100 includes a number of canonical features—i.e. items of information that are relatively standard for invoices. Invoice 100 has a number of canonical features, including, for example: a title 102; an invoice number 104; an invoice issue date 106; an invoice due date 108; an issuer data header 110; an issuer name 112; an issuer business number 114; an issuer post office box 116; issuer city details 118; a recipient data header 120; recipient name 122; recipient post office box 124; recipient city details 126; first second and third line item descriptions 128, 130 and 132, with first second and third line item amounts 134, 136, 138; an invoice subtotal 140; a tax amount 142; and a total amount 144.

Canonical features may (but need not) comprise both a label element and a data element. For example, in example invoice 100: the title canonical 102 includes a data element (the text 'Tax Invoice—ABC') but no label element; the due date canonical 108 includes both a label element 108L (the text "Invoice Due Date") and data element 108D (the text "Jan. 15, 2017"); the issuer data header canonical 110 includes a label element (the text 'From') but no data element.

Further, canonical features may be defined with differing granularities. For example, in the description of invoice 100 above a relatively coarse granularity has been adopted for ease of explanation. A finer granularity may, however, be used. For example, rather than being a single canonical feature the invoice issue date may be considered three separate canonicals: invoice issue date day, invoice issue date month, and invoice issue date year.

In order to improve the identification and extraction of information from an electronic document, the embodiments described herein generate and make use of what will be referred to as a document codification. The document codification for a given document is a numerical codification of various features of that document. Each feature that forms part of the document codification is itself a numerical codification (i.e. a feature codification) of various attributes that describe that feature. Document and feature codification is discussed in further detail below. In some respects, codifying a document in the manner described herein can be considered to generate a document 'genome', with the document genome being the combination of the 'genes' of the document (i.e. the codifications of individual features of the document).

The feature codifications that form part of a document codification can comprise canonical feature codifications (i.e. codifications of canonical features of the document) and document-level feature codifications (i.e. codifications of document level features of the document). These will be described in turn.

Canonical Features and Canonical Feature Codification

Canonical features are information elements that could be expected to (though need not necessarily) appear in a document.

For the purposes of codification, each canonical feature is identified by an identifier. Furthermore, in certain embodiments canonical features are also flagged or otherwise recorded as being canonical features that have a variable vertical position. In the context of invoices, for example, the vertical position of certain canonical features in the invoice may change. One such canonical feature may be the 'Total amount' canonical feature, which typically appears after a list of line items. As different invoices (even from the same issuer) will have different numbers of line items, the vertical position of the total amount will vary (though typically its horizontal position on a page will remain the same).

Table A below provides an example data structure for storing the canonical features that may be found in a document, and their associated identifiers. In this example, the data structure also stores information on whether or not the feature is considered to have a variable vertical position and dictionary keywords/phrases associated with the canonical feature. Alternative data structures could be used and the actual canonical features mentioned in Table A are shown by way of example only. For example, the vertically variable information and/or keyword information could be stored in one or more other tables either unlinked or linked (e.g. by the canonical feature identifier).

TABLE A

Example canonical feature data structure

| Identifier | Canonical feature | Vertically variable? | Dictionary terms |
|---|---|---|---|
| 1 | Unknown | NA | |
| 2 | Invoice issue date | N | "issued"; "issue"; . . . . |
| 3 | Invoice due date | N | "due"; "payable by"; "payable on"; "pay by"; "pay on"; |
| 4 | Terms and conditions | Y | "terms"; "conditions"; . . . |
| 5 | Total amount | Y | "total"; "amount payable"; . . . |
| . . . | . . . | . . . | . . . |
| N | Xxx | | "xxx"; . . . |

An 'unknown' canonical feature is allowed for in order to be able to distinguish between canonical features that have not been considered/processed at all (in which case a null or zero value may be used) and canonical features that have been processed but which could not be identified (which can be coded with the identifier of the 'unknown' canonical feature.

In practice, many more canonical features of an invoice would be used. As a general proposition, any information element that has a reasonable likelihood of being included in an invoice can be captured as a canonical feature. For example, canonical features of an invoice may describe: dates (e.g. issue date, due date, etc); involved entities (e.g. names, addresses, contact details, business numbers etc. of seller, buyer, shipping party, party being shipped to, payer); amounts (e.g. currency, total amount, taxes, freight charges, etc.); line items (e.g. goods/services description, taxable, line item amount, etc.); terms and conditions; etc. Other types of documents will have other types of canonical features.

As noted above, in order to generate a document codification, canonical features of a document are numerically coded based on certain attributes that describe the feature. A specific codification of a particular canonical feature will be referred to as the canonical feature codification, or simply the canonical codification.

The particular attributes used to codify a canonical feature may vary. In the present embodiments the attributes used to codify a canonical feature include dimensional attribute and categorical attributes. A dimensional attribute uses a numerical value to describe particular dimension or position of a particular canonical feature in the document. A categorical attribute use a category value to describe a particular property of the feature. Furthermore, in the present embodiments the attributes used to codify a canonical feature include attributes defining a label element of the feature (if present) and attributes defining a data element of the feature (if present).

Table B below provides an example of attributes that are used to describe canonical features in certain embodiments. A short form identifier for the attribute is also provided. In the short form identifier, a '.D' suffix indicates the attribute describes a data element of a feature, a '.L' suffix indicates the attribute describes a label element of a feature, and no suffix indicates the attribute describes the canonical feature as a whole.

TABLE B

Example attributes for coding a given canonical feature

| Canonical feature attribute | Identifier(s) |
|---|---|
| The x-coordinate of the left-most text position. (Dimensional attribute.) | XT XT.D XT.L |
| The y-coordinate of the upper-most text position. (Dimensional attribute.) | YT YT.D YT.L |
| The x-coordinate of the right-most text position. (Dimensional attribute.) | XB XB.D XB.L |
| The y-coordinate of the bottom-most text position. (Dimensional attribute.) | YB YB.D YB.L |
| The x-coordinate of the center of the text position. (Dimensional attribute.) | CX.D CX.L |
| The y-coordinate of the center position of the text. (Dimensional attribute.) | CY.D CY.L |
| A coded value indicating the font style of the text. (Categorical attribute.) Any appropriate coding may be used, for example: 1: Times New Roman 2: Arial 3: Courier New . . . | FT.D FT.L |
| The font size of the text. (Dimensional attribute.) | FS.D FS.L |
| A coded value indicating the font weight of the text. (Categorical attribute.) Any appropriate coding may be used, for example: 1: Bold. 2: Normal. | FW.D FW.L |
| A coded value indicating the data type of the feature. (Categorical attribute.) Any appropriate coding may be used, for example: 1: Unknown. 2: Alpha. 3: Numeric. 4: Alphanumeric. 5: Numeric with special character(s). 6: Alpha with special character(s). 7: Alphanumeric with special character(s). | DT.D |
| A horizontal distance between a feature label and the associated feature data. (Dimensional attribute.) | DX |
| A vertical distance between a feature label and the associated feature data. (Dimensional attribute.) | DY |
| A coded value indicating whether canonical feature extracted using a label or not. (Categorical attribute.) Any appropriate coding may be used, for example: 1: only label found in document, no value found. 2: only value found in document, no label found. 3: both value and label found in document. | E |

Additional, fewer, or alternative attributes may be used to describe/codify canonical features. The selected attributes may depend, for example, on the quality and complexity of the document being processed.

As can be seen in Table B, a number of attributes are separately able to be coded for the feature as a whole (in which case no suffix is added to the attribute identifier), the feature data (indicated by a '.D' suffix to the attribute identifier) and the feature label (indicated by a '.L' suffix to the attribute identifier). One example of such is the XT attribute: XT is the x-coordinate of the left-most text position of the feature as a whole; XT.D is the x-coordinate of the left-most text position of the data element of the feature (where data is present); and XT.L is the x-coordinate of the left-most text position of the label element of the feature (where a label is present).

By using the canonical feature identifiers of Table A and the attributes of Table B, any canonical feature attribute can be individually identified and codified. For example, the identifier 'XT.L2' refers to the x-coordinate of the left-most text position of the label of the invoice issue date feature (the identifier '2' referring to the invoice issue date feature, per Table A).

Moreover, the canonical feature as a whole can be codified by using all relevant attributes for that feature. In order to codify canonical features a canonical feature codification template is used. The canonical feature codification template defines the order in which the attributes that make up a canonical feature codification appear. Returning to the invoice example, and using the canonical features described in Table B above, the canonical feature codification template may take the following general form:

[XT.L, YT.L, XB.L, YB.L, FT.L, FS.L, XT.D, YT.D, XB.D, YB.D, FT.D, FS.D, E, CXL, CYL, CXD, CYD, DX, DY, XT, YT, XB, YB, DT.D, FW.D, FW.L]

A comma-separated list has been used to illustrate the canonical feature codification template, but any appropriate data structure may be used.

Continuing with this example, the specific attributes for codifying the invoice issue date feature (having feature identifier 2) of a document are:

[XT.L2, YT.L2, XB.L2, YB.L2, FT.L2, FS.L2, XT.D2, YT.D2, XB.D2, YB.D2, FT.D2, FS.D2, E2, CXL2, CYL2, CXD2, CYD2, DX2, DY2, XT2, YT2, XB2, YB2, DT.D2, FW.D2, FW.L2]

And an example of the actual canonical feature codification:

[375, 218, 429, 227, 8, 9, 539, 218, 575, 227, 8, 9, 3, 2, 222, 557, 226, 164, 0, 375, 218, 575, 227, 5, 2, 2]

Document-Level Feature and Document Level Feature Codification

As noted, a document-level feature may also be used in codifying a document.

The document-level feature comprises attributes that relate to a document in general. In certain embodiments, and by way of example, document-level feature attributes comprise: document height (indicated by brace 150 in FIG. 1), document width (indicated by brace 152 in FIG. 1), the zero point 154 of the document, and the document density (not referenced). Additional, fewer, or alternative attributes may be used to describe/codify the document-level feature.

Document height 150 and width 152 are a measurement of the height/width the document would be if printed at its actual size/displayed at 100% size.

The zero point 154 of the document is made up of an x coordinate which is the left-most position at which text appears on the document page (indicated by dot-dash line 156—the line not forming part of the actual document) appears and a y coordinate which is the top-most position at which text appears on the document page (indicated by dot-dash line 158—the line not forming part of the actual document). In certain implementations, the zero point 154 of a document is used as a comparison point to compare different documents. In other implementations, coordinate positions of text rectangles and canonical features may be calculated as offsets from the zero point 154 (rather than from the absolute edges of the document).

Document density 156 is a measure of the content mass of the document (or of a page of the document). Document density may be calculated in a variety of ways. For example, in certain embodiments document density is calculated by calculated the area of the document covered by text rectangles, dividing that area by the page area, and multiplying by 100 to give a percentage of the document that is covered by text rectangles. The identification/recordal of text rectangles is described below and an example of a text rectangle dataset is provided in Table D. With reference to this table, the document density may be calculated as follows:

$$\Sigma(((x2-x1)*(y2-y1))/(height*width))*100$$

Where: x2 is the rightmost x coordinate of a text rectangle; x1 is the leftmost x coordinate of a text rectangle; y2 is the bottommost y coordinate of a text rectangle; y1 is the topmost y coordinate of a text rectangle); height is the height of the document page on which the text rectangle appears; and width is the width of the document page on which the text rectangle appears.

In certain embodiments, only the density of one or more defined portions of the document is calculated and used as a document level feature. By way of example, in the context of invoices the upper portion of the same and similar invoices contains relatively static information. The lower portion, however, can often vary significantly as this is where invoice line items appear. For example, even for two invoices issued by the same entity (and therefore would be considered very similar) the upper portion may have a similar density (due to the header information being largely the same) but the lower portion may have a vastly different density (due, for example, to one invoice having a single line item and the other having 10 line items). To account for this, in certain embodiments only the density of the upper portion (for example the top 33% of the invoice) is calculated/used.

As with the canonical feature codification above, the document-level feature is also numerically codified according to a document-level feature codification template. The document-level feature codification template describes the order of the attributes that make up a document-level feature codification. One example of a document-level feature codification template is as follows:

[density, height, width, zero-point x-coordinate, zero-point y-coordinate]

And an example of a specific document-level feature codification:

[5.00, 792.00, 612.00, 36.00, 27.00]

Document Codification

Using the codified features described above, a document can be codified as a whole.

In order to codify a given document a document codification template is used. The document codification template for a given type of document (e.g. an invoice type of document) defines the order in which the features (and the attributes of those features) are to be recorded.

Returning to the invoice example, and using the canonical features and document-level feature described above, the document codification template of an invoice type of document may take the following general form:

[document-level feature, canonical feature 1, canonical feature 2, canonical feature 3, . . . , canonical feature n]

The order of the attributes of each document feature are then as per the codification template for that feature. Taking these attributes into account, FIG. 2A depicts an example document codification template 200 for invoice type documents. Document codification template 200 describes all attributes that make up a document codification and the order in which those attributes appear. Specifically, document codification template 200 comprises: the attributes of the document-level feature 202, the attributes of the invoice issue date canonical feature 204 (i.e. the canonical feature with identifier 2), the attributes of the invoice due date canonical feature 206 (i.e. the canonical feature with identifier 3), the attributes of the invoice number canonical feature 208 (i.e. the canonical feature with identifier 4), the attributes of the xxx canonical feature 210 (i.e. the canonical feature with identifier n). Template 200 is shown as a comma-separated list (with line breaks added between features for readability), but any appropriate data structure may be used.

FIG. 2B depicts an example of a specific document codification 212 (e.g. a document genome). Document codification 212 uses document codification template 200 above, and thus the specific meaning of any given value in the codification can be determined by reference to template 200.

In some cases, attribute values may be 0. Depending on the attribute value in question, this may either be interpreted that the particular attribute(s) were not present in the document or (for positional/coordinate values) that the position is 0. These two cases can be distinguished by consideration of other attribute values for a given canonical feature. For example, if a non-zero font size attribute value is recorded, this indicates that there is a text rectangle and (as such) 0 coordinate values do, in fact, mean a 0 position. Alternatively, if a zero font size attribute value is recorded, this indicates that no text rectangle has been identified, and that any 0 coordinate values indicate a non-identified feature.

Document Reference Set and Document Relationships

In order to assist with processing a given document, a reference set of document codifications is maintained—e.g. on a local or remote computer readable memory.

Each document codification in a reference set is the codification of a given document according to the same document codification template. In the invoice example, a reference set of invoice codifications is maintained.

For convenience, the reference set of document codifications will be referred to as a reference set, and a document codification from the reference set will be referred to as a reference codification.

A reference set may, for example, be stored in a comma separated value (.csv) file which can easily be presented as a table. FIG. 3 provides an example of part of a reference set presented as a table 300. In table 300, each row (except for the first row which provides column headings) stores the values of a single reference codification. The first column 302 stores a reference codification identifier uniquely identifying the reference codification of the row. The remaining columns 304 store the attribute values per the document codification template (i.e. all attributes of all document features that contribute to the codification). As can be seen, due to space restrictions table 300 only shows part of the document reference set. The actual document reference set includes many more columns (storing attributes of additional canonical features), and may have many more rows (storing additional reference codifications).

A reference set of document codifications may be generated in a variety of ways. For example, document codifications may be prepared by manually (or semi-manually) processing a document to record the relevant attributes. In addition, new documents processed as discussed below may be added to the reference set. The reference set becomes larger and more useful as more documents are processed and additional codifications are added.

Generating and storing document codifications as described above may provide various technical advantages. For example, a document codification (i.e. a list of numerical values) will typically be a relatively small amount of data when compared to the file for a document itself—and as such storing document codifications requires less memory than storing actual documents. This advantage is particularly prominent when large number of document codifications are to be stored and processed: the relatively small size of the document codifications requiring a relatively low amount of storage, and the numerical nature of the codifications allowing for relatively fast computation.

For example, the reference set of codifications can be efficiently processed to isolate any particular feature codification (or gene). E.g., if the manner in which the invoice issue date feature (identifier 2) is expressed in various invoices is of interest, all codifications of that feature from all reference codifications can be seen (i.e. by extracting or filtering all attributes with a '2' suffix). Even more granularly, if a specific attribute of a specific feature is of interest, the exact value of that attribute in all reference codifications can also be efficiently established. For example, the leftmost x-coordinate of the issue date label in all reference codifications can be seen by extracting/filtering 'XT.L2' values.

Figure 4:
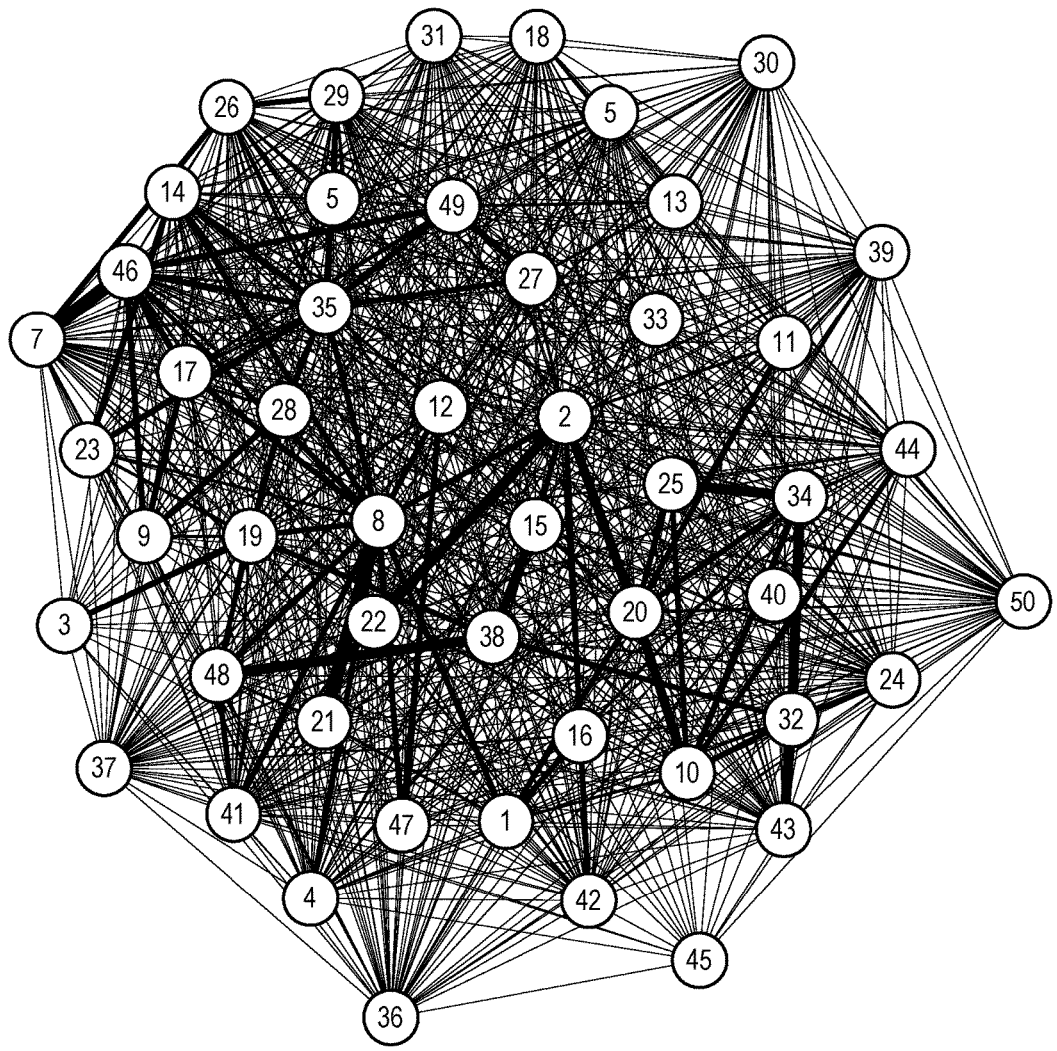
FIG. 4 illustrates relationships between the document codifications of different documents.

Further, various processing and calculations can be performed using the numerical document codifications. For example, FIG. 4 provides a visualization of the relationships between fifty different document codifications. In FIG. 4, each numbered circle (1 to 50) represents a specific document codification (e.g. a specific invoice that has been codified according to the document codification template). The weight of the edges joining the numbered circles indicate how similar one document codification is to another—lighter weight edges indicating relatively lesser similarity and heavier weight edges indicating relatively greater similarity. For example, the edge joining codification 8 and codification 21 is quite heavy, indicating these documents are quite similar. In contrast, the edge joining codification 45 and codification 50 (on the lower right hand side of FIG. 4) is relatively light, indicating these documents are not particularly similar.

The visualization of FIG. 4 is a graph of an inverse distance matrix which is computed by using the specified distance measure to compute the distance between the rows of a data matrix. Distance matrices are discussed in, for example: Becker, R. A., Chambers, J. M. and Wilks, A. R. (1988) *The New S Language*. Wadsworth & Brooks/Cole; Mardia, K. V., Kent, J. T. and Bibby, J. M. (1979) *Multivariate Analysis*. Academic Press; Borg, I. and Groenen, P. (1997) *Modern Multidimensional Scaling. Theory and Applications*. Springer.

Table C below provides an example of code in R (a language/environment for statistical computing and graphics) that can be used to read a document reference set from a .csv file, calculate a distance matrix, invert the distance matrix, and generate a visualization such as that shown in FIG. 4.

TABLE C

Visualization generation code

```
nba <- read.csv("InvoiceGenomeSMALL.csv",header=T,sep =",")
dist_m <- as.matrix(dist(nba[1:50, -c(1,2)]))
dist_mi <- 1/dist_m # similarity
library(qgraph)
jpeg('example_forcedraw.jpg', width=1000, height=1000, unit='px')
win.graph( )
qgraph(dist_mi, layout='spring', vsize=4)
```

Document Processing

Figure 5:
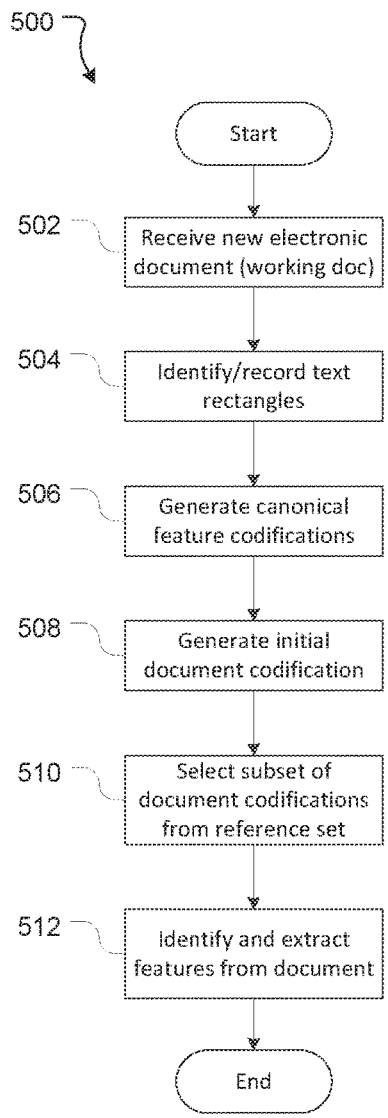
FIG. 5 illustrates a high level process for identifying and extracting information from a document.

This section describes the processing of a document in order to identify and extract information elements therefrom. This process will be described with reference to computer implemented process 500 of FIG. 5.

At 502, a new electronic document is received. This will be referred to as the working document. The working document may be received in various ways. For example, the working document may be received in an email or other electronic communication over a communications interface (e.g. interface 918 described below). Alternatively, the working document may be generated from a physical document by photographing, scanning, or otherwise digitizing the physical document using an input device such as a camera, scanner, or other input device (e.g. input device 914 described below). Where a document is converted the conversion process will advantageously provide as precise a digitization of the document (e.g. in terms of pixel positions/coordinates) as possible.

If necessary, the working document may be processed to be converted from the format in which it is received into a particular format (e.g. .pdf) for downstream processing.

At 504, the working document is processed in order to identify and record all text rectangles in the working document. Various tools/programs/applications can be used for this purpose, for example the PDFium (https://pdfium-.googlesource.com/pdfium/) and PDF.js (https://mozilla-.github.io/pdf.js/) libraries. Once the document has been parsed and text rectangles have been identified, relevant information on the text rectangles can be stored in any appropriate data structure, one example of which is shown in Table D below.

TABLE D

| | | | | | | | | | | | | | |
|---|---|---|---|---|---|---|---|---|---|---|---|---|---|
| Text rectangle dataset ||||||||||||||
| Key | Data | Font | Font Size | Font Style | Font W'ght | H'ght | P. # | Rect. ID | W'th | X1 | X2 | Y1 | Y2 |
| 00c76efd | INVOICE | Arial | 14 | Norm. | bold | 792 | 1 | 20125bb4 | 635 | 365 | 422.57 | 23.45 | 36.4 |
| 00c76efd | Invoice No. | Arial | 8 | Norm. | bold | 792 | 1 | a145ff25 | 635 | 378.66 | 421.34 | 43.26 | 50.66 |
| 00c76efd | Invoice Date | Arial | 8 | Norm. | bold | 792 | 1 | 90b82bf8 | 635 | 446.44 | 493.56 | 43.26 | 50.66 |
| 00c76efd | Terms | Arial | 8 | Norm. | bold | 792 | 1 | ae26a70d | 635 | 533 | 557 | 43.26 | 50.66 |
| 00c76efd | 720135 | Arial | 8 | Norm. | Norm. | 792 | 1 | 103a7910 | 635 | 382.21 | 417.79 | 56.76 | 64.16 |
| 00c76efd | Net 30 days | Arial | 8 | Norm. | Norm. | 792 | 1 | 18b68674 | 635 | 523.66 | 566.34 | 56.76 | 64.16 |

TABLE D-continued

Text rectangle dataset

| Key | Data | Font | Font Size | Font Style | Font W'ght | H'ght | P. # | Rect. ID | W'th | X1 | X2 | Y1 | Y2 |
|---|---|---|---|---|---|---|---|---|---|---|---|---|---|
| 00c76efd | Amount Due | Arial | 8 | Norm. | Norm. | 792 | 1 | e5a7678f | 635 | 366 | 416.22 | 76.76 | 84.16 |
| 00c76efd | PO Box 742 | Arial | 8 | Norm. | Norm. | 792 | 1 | 25a65a9d | 635 | 65 | 121.48 | 78.26 | 85.66 |
| 00c76efd | Los Angeles | Arial | 8 | Norm. | Norm. | 792 | 1 | 45b7bb93 | 635 | 65 | 169.5 | 87.26 | 94.66 |

In Table D, a row is provided for each text rectangle identified in the working document. Columns record the relevant information in respect of a given text rectangle. In this example, the information recorded for each identified text rectangle comprises: a key (a unique identifier for the document to which the record relates); a data value (the actual text that appears in the text rectangle); a font type value (recording the font type of the text); a font size value (recording the font size of the text); a font style value (recording whether the text is italic or normal); a font weight value (recording whether the text is normal or bold); a height value (recording the height of the document page); a page number value (recording which page of the document the text rectangle appears on); a text rectangle identifier (a unique identifier for the text rectangle); a width value (recording the width of the document page); an X1 value (the x coordinate of the leftmost position of the text rectangle); an X2 value (the x coordinate of the rightmost position of the text rectangle); a Y1 value (the y coordinate of topmost position of the text rectangle); and a Y2 value (the y coordinate of the bottommost position of the text rectangle).

As will be appreciated, positional information with respect to text rectangles may be recorded in alternative ways. As one alternative example, rather than storing leftmost/rightmost x coordinates and topmost/bottommost y coordinates, reference x/y coordinates may be stored (e.g. indicating the position of the top left corner of the text rectangle) along with a text rectangle width and height.

At 504, attributes of the document-level feature described above can also be calculated for the working document. As described above, and in certain embodiments, this comprises calculating/extracting the following attributes: a document density, a document width, a document height, a zero-point x-coordinate, and a zero-point y-coordinate.

At 506, the working document is processed to attempt to identify at least some canonical features present in the document and generate canonical feature codifications for those features. The purpose of this step is to allow at least a partial document codification to be generated (at 508, discussed below).

Auto suggestion at 506 can be performed in a variety of ways. As one example, a canonical feature dictionary may be maintained in which keywords (or combinations of keywords) are associated with specific canonical features. As one example, and as described with respect to Table A above, the dictionary may be maintained as part of a canonical feature data structure. The text rectangle dataset can be searched to identify text rectangles with data (i.e. text) matching dictionary keywords. If a text rectangle with data matching a keyword/combination is identified, that text rectangle is considered (at least initially) to be the label of the canonical feature associated with that keyword. The label attributes of the canonical feature can then be coded based on the details of the identified text rectangle. Further, if the identified text rectangle is closely positioned to the left or above another text rectangle, the proximate text rectangle can be considered the data element of the same canonical feature (and coded accordingly).

For example, in the canonical feature dictionary the canonical "invoice due date" feature may be associated with keywords such as: "due"; "payable by"; "payable on"; "pay by"; "pay on"; etc. If, on searching the text rectangle dataset, the word "due" is identified as the data of a text rectangle, that rectangle is considered to be a possible match for the label element of the invoice due date canonical.

It is unlikely at 506 that all canonical features in the working document will be identified. It is also possible at 506 that some canonical features will be misidentified. As discussed below, however, having some canonical feature codifications assists with the identification (and/or correction) and extraction of further canonical features.

At 508, an initial document codification is generated for the working document. The initial document codification may include the document level feature codification (using details generated at 504) and the canonical feature codifications generated at 506. For canonical features that were not identified and codified at 506, the attribute values in the document codification are set to 0.

At 510, the initial document codification generated at 508 is used to generate a comparison set of reference codifications from the reference set. The comparison set generated comprises a number of document codifications from the reference set that are the calculated to be the most similar to the initial codification of the working document.

A maximum number of reference codifications to be included in the comparison set is defined. As a general proposition, a larger comparison set will require more downstream processing than a smaller comparison set, but may also provide more accurate results. By way of example, in certain embodiments the size of the comparison set may be set at 100 reference codifications, meaning that the comparison set will include at most 100 reference codifications from the reference set (being the 100 reference codifications that are the most similar to the initial document codification).

Figure 6:
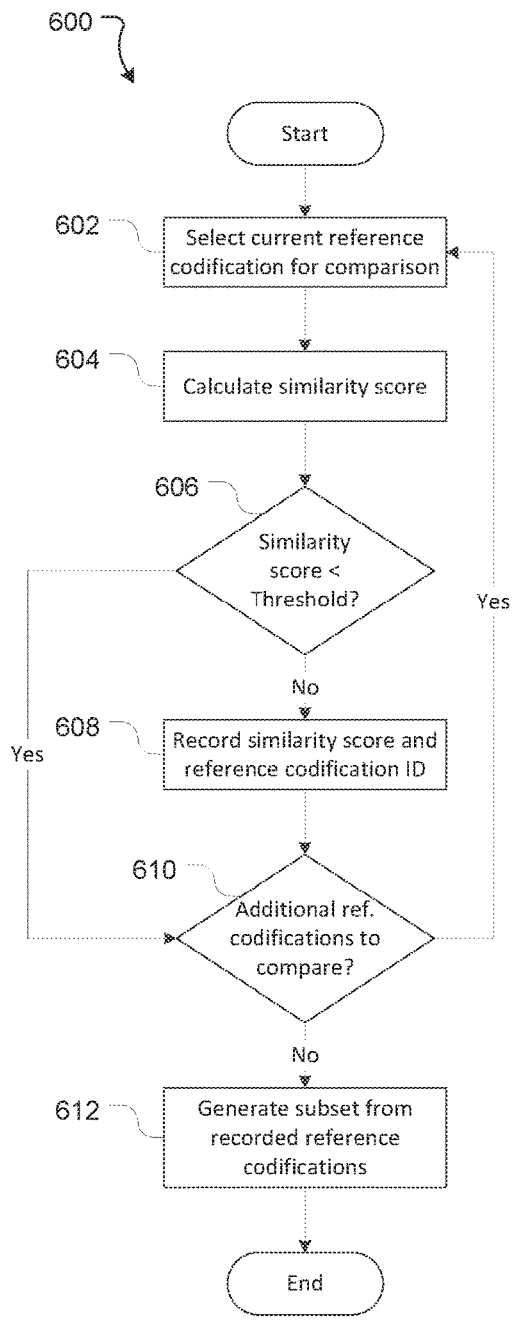
FIG. 6 illustrates a process for generating a comparison of document codifications from a reference set of document codifications.

The comparison set of reference codifications may be selected in a variety of ways. An example process 600 for doing so is described below with reference to FIG. 6. In other embodiments, no comparison set is generated (i.e. all codifications from the reference set are used in further processing).

At 512, the comparison set of reference codifications (generated at 510) is used to identify and extract features from the working document. This processing is described further with reference to FIG. 7 below.

Generating a Comparison Set of Reference Codifications

At 510 above, a comparison set of reference codifications is generated from the reference set. In certain embodiments, the comparison set is generated according to process 600 shown in FIG. 6.

Generally speaking, process 600 involves comparing each document codification in the reference set with the initial document codification generated at 508. For each document codification a similarity measure is calculated, the similarity measure being a measure of the similarity between the reference codification and the initial document codification. The n most similar reference codifications are then included in the comparison set of reference codifications.

At 602, a current reference codification is selected from the reference set for processing. Reference codifications may be selected for processing in any order (e.g. in order of their identifiers).

At 604, a similarity measure for the current reference codification is calculated. The similarity measure is a measure of the similarity between the current reference codification and the initial document codification generated at 508.

The similarity measure can be calculated in any appropriate way. In certain embodiments, the similarity measure is a score calculated by comparing certain attributes of the current reference codification with corresponding attributes of the initial document codification. If corresponding attributes are the same or sufficiently similar, the score is incremented. If corresponding attributes are the same or sufficiently similar, the score is not incremented. The actual attributes selected to contribute to the similarity measure calculation may vary from implementation to implementation. For example, in certain embodiments, only attributes which record X or Y coordinates or distances/offsets are considered. In other embodiments, certain categorical attributes are also considered.

In comparing corresponding attributes various rules may be applied.

For example, when comparing categorical attributes a rule may be defined that requires the values of the corresponding attributes to be identical in order for the score to be incremented. For dimensional/positional attributes, however, a tolerance may be provided so that even if corresponding attribute values are not identical they may still be considered sufficiently similar (provided the values are within the defined tolerance) and the score incremented. For example, a tolerance of 3 pixels may be applied to dimensional attributes.

In comparing pairs of attributes, if either or both attributes in a corresponding pair has a zero value that attribute will not be considered in the calculation, as doing so could compromise the results.

Table E below provides an example of a partial similarity measure calculation between an initial working document codification and a reference codification:

As can be seen in Table E, the values of the following pairs of corresponding attributes are the identical: height, width, E2 (the categorical attribute indicating whether the 'invoice due date' feature was extracted using a label or not), and CX.D2 (the x-coordinate of the center of the text position of the 'invoice date' data element). Accordingly, each of these pairs results in an increment to the similarity score.

Although not the same, the values of the corresponding XT2 (the x-coordinate of the leftmost position of the 'invoice date' feature) attributes also result in an increment to the similarity measure. This is because XT is a dimensional attribute and a tolerance (e.g. 3) is taken into account when determining similarity. As the attribute value for the initial document codification (24) is within 3 of the attribute value of the reference codification (22) these values are considered sufficiently similar.

In contrast to the XT attribute, the DT.D2 pair of attributes does not result in the score being incremented even though the two values are only 1 apart (2 and 3 respectively). This is because DT is a categorical attribute (indicating the data type of the invoice date) and as such must be identical to be considered similar.

The corresponding pair of YT2 attributes also does not result in score being incremented. Although YT2 is a dimensional attribute (and as such a tolerance is applied), the initial document codification value (46) differs from the reference codification value (52) by greater than the allowed tolerance (in this example 3). For the same reason the comparison of the pair of CY.D2 attributes does not add to the similarity measure.

As the values of the CX.L2 and CY.L2 attributes are zero, these are flagged as NA (or null).

Accordingly, for the partial comparison shown in Table E the similarity measure is 62.5% ((⅝)*100). This is calculated as ((the number of same/similar attribute pairs)/(the number of contributing attribute pairs)*100). The number of contributing attribute pairs is the total number attribute pairs minus those not compared due to a zero value (i.e. those marked Null/NA in Table E).

Table F provides another example of a partial similarity measure calculation:

TABLE E

| Partial similarity measure calculation | | | | | | | | | | | |
|---|---|---|---|---|---|---|---|---|---|---|---|
| Attribute | Height | Width | E2 | XT2 | YT2 | ... | DT.D2 | CX.L2 | CY.L2 | CX.D2 | CY.D2 |
| Initial document codification | 841.88 | 595.28 | 2 | 24 | 46 | ... | 2 | 0 | 0 | 48 | 51 |
| Reference codification | 841.88 | 595.28 | 2 | 22 | 52 | ... | 3 | 0 | 0 | 48 | 70 |
| Similarity measure | 1 (T) | 1 (T) | 1 (T) | 1 (T) | 0 (F) | ... | 0 (F) | NA | NA | 1 (T) | 0 (F) |

TABLE F

| | Partial similarity measure calculation | | | | | | | | | |
|---|---|---|---|---|---|---|---|---|---|---|
| Attribute | Height | Width | E2 | XT2 | YT2 | ... | DT.D2 | CX.L2 | CY.L2 | CX.D2 | CY.D2 |
| Initial working document codification | 841.88 | 595.28 | 2 | 24 | 46 | ... | 2 | 29 | 48 | 48 | 51 |
| Reference codification | 841.88 | 595.28 | 2 | 22 | 52 | ... | 3 | 23 | 54 | 48 | 70 |
| Similarity measure | 1 (T) | 1 (T) | 1 (T) | 1 (T) | 0 (F) | ... | 0 (F) | 0 (F) | 0 (F) | 1 (T) | 0 (F) |

In Table F, the final similarity measure is 50% ((5/10)*100). As can be seen, although Tables E and F both have six attribute pairs that are the same/similar, the similarity measure for Table F is lower than that of Table E. This is due to the fact that the Table E comparison yielded two NA/Null values while the Table F all pairs of attributes were considered.

Alternative similarity measures/calculations may be used. For example, while NA and False values have been treated differently in the examples discussed with respect to Tables E and F, they could be treated the same and the calculation made simply on the basis of ((number of same/similar attribute pairs)/(total number of attribute pairs considered)*100). In this case the similarity scores for Tables E and F would both be 50% ((5/10)*100).

In order to illustrate the example similarity measure calculation only a small number of attributes are shown in Tables E and F. When calculating the actual similarity measure of a document, however, all relevant attributes of the document codifications would be taken into account.

At 606, the similarity measure calculated at 604 is compared against a similarity threshold. The threshold value is set in order to avoid including reference codifications in the comparison set that are too dissimilar to the working document to be of valuable (or any) use in downstream processing. This threshold is applied even if it results in a comparison of reference codifications that has less reference codifications than the maximum number permitted. The actual threshold value is selected according to the number of attributes being compared and the amount of reference data available.

If, at 606, the similarity measure is greater than or equal to the similarity threshold, the process continues to 608. At 608, the similarity measure calculated for the current reference codification is saved, along with an identifier for that reference codification. The process then continues to 610.

If, at 606, the similarity measure is less than the similarity threshold, the process continues directly to 610.

At 610, a determination is made as to whether there are further reference codifications against which the working codification needs to be compared.

If, at 610, there are further reference codifications to be compared, the process returns to 602 to select a new reference codification (i.e. one that has not previously been processed/compared) for comparison.

If, at 610, all reference codifications from the reference set have been compared, the process continues to 612. At 612, the comparison set of reference codifications is generated based on the comparison scores and reference codification identifiers recorded at 608. Specifically, the comparison set is generated to include the n reference codifications with the highest similarity measures (n being the defined maximum size of the comparison set). If less than n reference codifications were recorded at 608, all reference codifications recorded are included in the comparison set.

Generation of Final Working Document Codification

Figure 7A:
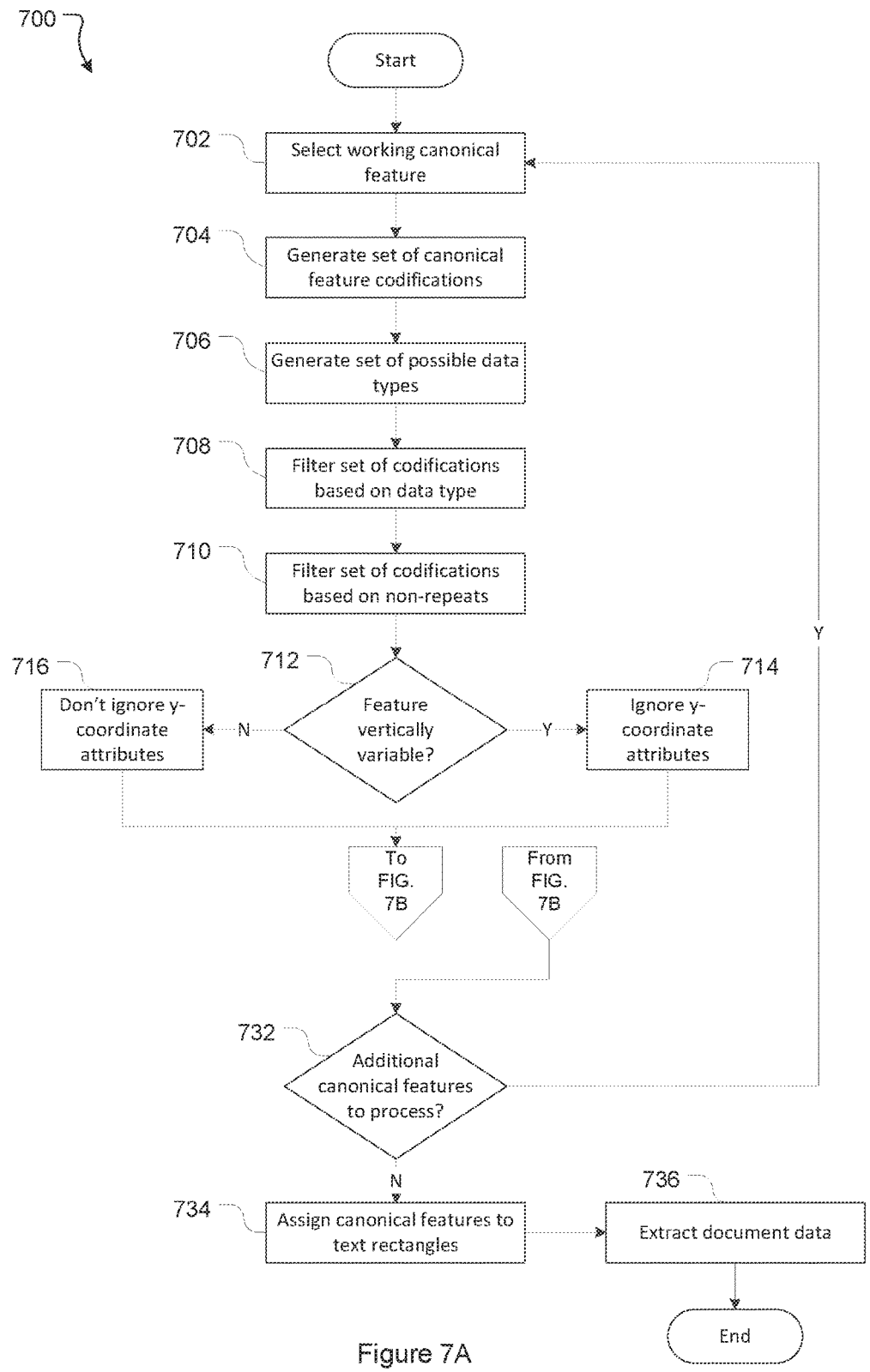
FIG. 7A and FIG. 7B illustrate a process identifying and extracting features from a document using the comparison set of document codifications generated according to the process of FIG. 6.
Figure 7B:
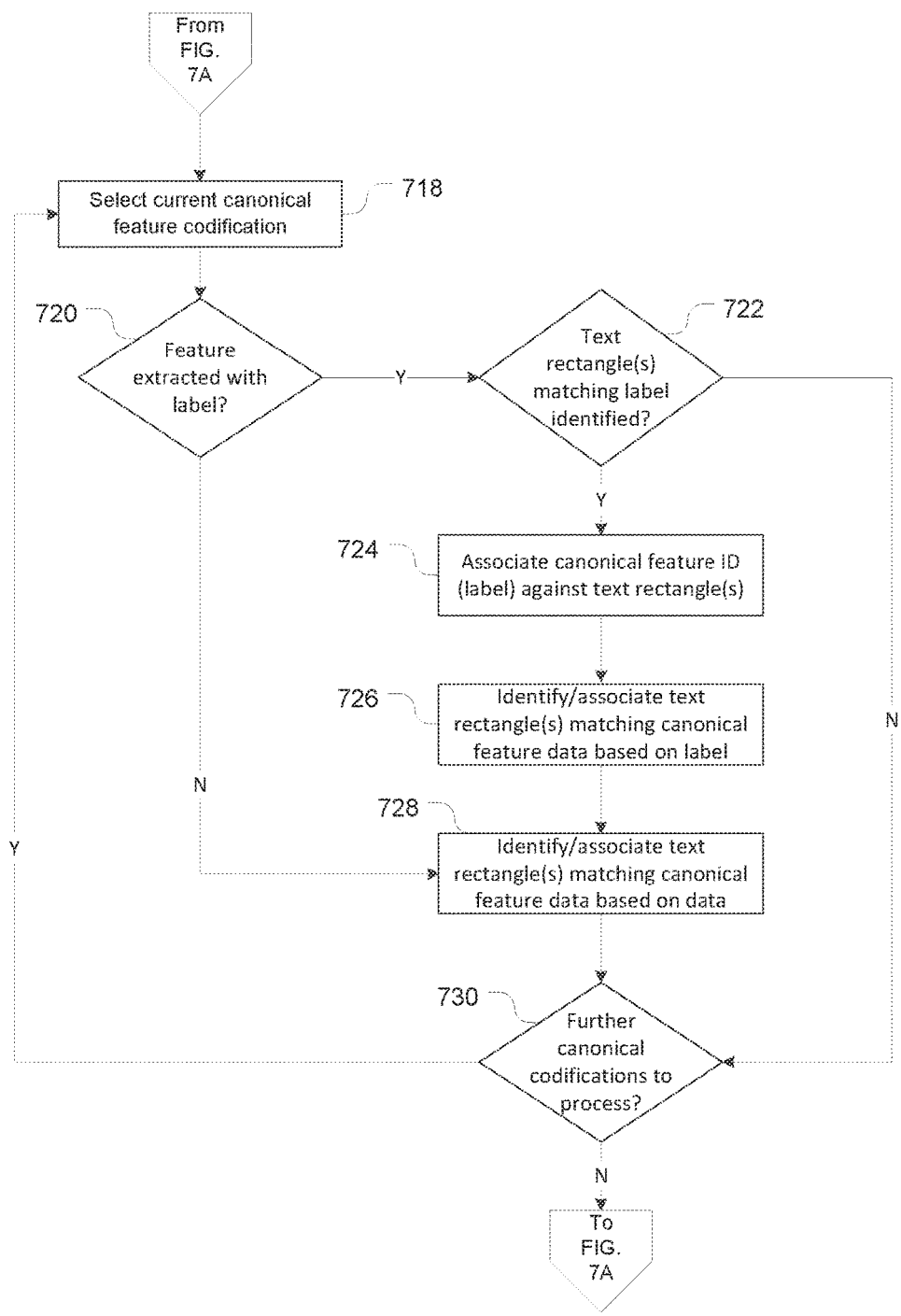

At 512 above, the comparison set of reference codifications (generated at 510) is used to identify and extract features from the working document. FIGS. 7A and 7B illustrate an example process 700 for performing this task.

Generally speaking, process 700 involves iterating through each canonical feature defined in the document codification template in turn. For each canonical feature, the codifications of that feature in the comparison set of reference codifications are iterated over in order to determine whether a given reference codification of the feature matches any text rectangles in the working document. If a reference codification of the canonical feature matches a working document text rectangle, that fact is recorded, and over process 700 multiple canonical features (either the same or different) may be recorded against a given text rectangle. Once all canonical features and all reference codifications of those features have been processed, the text rectangles of the working document are codified based on the most frequently assigned canonical features.

At 702, a working canonical feature is selected. Canonical features may be selected for processing in any order (e.g. sequentially according to the order of the canonical features in the document codification template). Through the operation of 702 and 732 (described below) process 700 iterates over all canonical features described in the document codification template.

At 704, a set of canonical feature codifications for the current canonical feature is generated/extracted from the comparison set of reference codifications. This set initially comprises the codification of the canonical feature from each document codification in the comparison set of reference codifications. Accordingly, the set of canonical feature codifications provides data on how the canonical feature currently being considered was presented in the n documents that have been determined to be most similar to the working document. More specifically, and amongst other things, the set of canonical feature codifications provides positional data (e.g. the XT.L, YT.L, XB.L and YB.L attribute values) on potential locations of the canonical feature.

FIG. 8 is table 800 which provides an example of the set of canonical feature codifications for the canonical feature with identifier 2 (e.g. invoice date in the example above). As can be seen, table 800 includes a column for each attribute of canonical feature 2 and a row for each of the n documents in the comparison set of reference codifications.

At 706, a set of possible data types for the current canonical feature is generated. The set of possible data types is the superset of all data types taken by the data element of the canonical feature (i.e. DT.D) in the comparison set of reference codifications. For example, in table 800 of FIG. 8, the superset of data types for the 'invoice issue date' canonical feature (i.e. DT.D2) is data types {4, 5, 7}—alphanumeric (data type 4), numeric with special character(s) (data type 5), and alphanumeric with special character(s) (data type 7). Accordingly, all three of these data types should, at least initially, be considered.

At 708, the set of canonical feature codifications generated at 704 is filtered to remove codifications with a data type that does not meet a threshold frequency. Various threshold frequencies may be applied, but in in certain embodiments a value of 10% is appropriate. For example, any canonical feature codification that occurs less than 10% of the time in the comparison set of reference codifications is deleted/not considered in further processing of the canonical feature. For example, if data type 2 occurred 80 times, data type 4 occurred 15 times, and data type 5 occurred 5 times, then rows with the data type coded as 5 would be removed from the comparison set of reference codifications (or otherwise marked to be ignored in further processing of the canonical feature).

At 710, the set of canonical feature codifications generated at 704 (and filtered at 708) is further filtered to remove any codifications that are not repeated, and to remove repeats of codifications that are repeated, from further processing.

In certain embodiments, a codification is considered to be repeated only if all attribute values or more than one reference codification are the same. For example, in the partial set of canonical feature codifications shown in table 800 of FIG. 8, the following canonical feature codifications are repeated (using the reference identifier from the table): {003, 025, 026}, {007, 011}, {008, 021, 022, 023, 024}, {012, 013, 015}, and {016, 017}. Accordingly, this partial set would be filtered by: removing reference codifications 001, 002, 004-006, 009, 010, 014, 018-020, and 100 (on the basis that they are not repeated); and removing reference codifications 025 and 026 (as repeats of 003), 011 (a repeat of 007), 021-024 (as repeats of 008), 013 and 015 (as repeats of 012) and 017 (a repeat of 016). This would leave only codifications 003, 007, 008, 012, and 016 for further processing.

In alternative embodiments, only dimensional attributes (e.g. positions) are considered, and a codification will be considered to be repeated if dimensional attributes are the same or within a defined tolerance.

Filtering the set of canonical feature codifications at 708 and 710 serves to remove noisy data from the set of canonical feature codifications and thereby improve downstream processing.

At 712, a determination is made as to whether or not the working canonical feature has a variable vertical position. If so, further processing of the working canonical feature ignores any attributes associated with a y-coordinate (as indicated at 714). Conversely, if the working canonical feature does not have a variable vertical position, further processing of the working canonical feature takes attributes associated with a y-coordinate into account (as indicated at 716). In both cases processing then continues to 718. The determination of whether the working canonical feature has a variable vertical position can be made, for example, by reference to a table/data structure such as that shown in Table A above.

Processing 718 to 730 (FIG. 7B) generally involves processing each of the canonical feature codifications in the set of canonical feature codifications (generated at 704 and filtered at 708 and 710) to determine whether the working document has a matching text rectangle.

At 718, a current canonical feature codification is selected from the set of canonical feature codifications (i.e. the set generated at 704 and filtered at 708 and 710). Canonical feature codifications from the set may be selected for processing in any order (e.g. sequentially according to the order of the canonical features in the document codification template). Through the operation of 718 and 730 (described below), process 700 iterates over all of the canonical feature codifications in the set of canonical feature codifications.

At 720, a determination is made as to whether or not the canonical feature in question (i.e. as selected 702) was extracted with a label. This determination is made with reference to the 'E' attribute of the canonical codification in the working document codification. For example, in the specific codification scheme described above, if the 'E' attribute of the canonical feature in question takes the value 3 this indicates that the canonical feature was extracted with a label.

If, at 720, the canonical feature is determined to have been extracted with a label, the process continues to 722. If not, the process continues to 728.

At 722, the working document is processed to determine if it has any text rectangles that match the label element of the current canonical feature codification. This determination is made, for example, with reference to the position attributes of the label elements (e.g. the XT.L, YT.L, XB.L and YB.L attributes of the current canonical feature codification), the coordinates of the text document rectangles (e.g. the X1, Y1, X2, Y2 values as stored in the text rectangle dataset), the actual data (text) within the document text rectangles, and the dictionary terms associated with the current canonical feature. By way of specific example, a text rectangle may be considered a match if:

(X1>=(XT.L+tolerance)) AND (X2<=(XB.L+tolerance)) AND (Y1>=(YT.L+tolerance)) AND (Y2<=(YB.L+tolerance)) AND (text rectangle data is relevant to current canonical feature)

This check determines whether any document text rectangles are positioned within boundaries defined by the X and Y coordinates of the label of the current canonical feature. If a text rectangle in the expected position is identified a further check is performed to see if the data of the identified text rectangle (i.e. the text) is relevant to the current canonical feature. This check may be performed using the canonical feature dictionary as described above. For example, if the canonical feature is the invoice due date and a text rectangle in the expected position has the data of "Due", it will be considered a match. Conversely, if the canonical feature is the invoice due date and a text rectangle in the expected position has the data of "Total", it will not be considered a match (on the presumption that in the canonical feature dictionary the term 'total' is not associated with the invoice due date canonical feature).

In alternative embodiments, determining if the document has any text rectangles that match the label element of the current canonical feature codification may be performed based on additional attributes, for example font size, font weight, and the possible data types (identified at 706).

As noted, a tolerance (e.g. 4 pixels) may be used in this determination to allow for some difference in position between the working document text rectangle and the position defined by the current canonical feature codification. Smaller/greater tolerances may be used, as may alternative methods of identifying text rectangles in the expected position of the canonical feature.

If one or more text rectangles matching the label is/are identified at 722, the process continues to 724. If no matching text rectangles are identified at 722, no further processing of the current canonical feature codification is performed and the process continues directly to 730.

At 724, the identifier of the current canonical feature (along with an indication that it is the label element of that canonical feature) is associated with any matching text rectangles identified at 722. This is to indicate that the text rectangle in question is potentially the label of the identified canonical feature and as such will be referred to as a preliminary association. The preliminary association may be recorded, for example, in a text rectangle/canonical feature association data structure in which canonical feature identifiers are associated with text rectangle identifiers (the text rectangle identifier taken from the text rectangle dataset of Table D above). An example of this is provided in Table G:

TABLE G

Text rectangle/canonical feature
association data structure

| Text rectangle identifier | Canonical feature identifier(s) |
|---|---|
| Aaaaaaa | 2.L |
| Bbbbbbb | 2.L |

In Table G the canonical identifier '2.L' has a preliminary association with the text rectangles with identifiers 'aaaaaaa' and 'bbbbbbb'. This indicates that these text rectangles have both been identified as potentially being the label ('L') of the canonical feature with identifier '2' (the 'invoice issue date').

At 726, an attempt to identify text rectangles in the working document that could correspond to the data element of the current canonical feature is made. At 726, the identification is based on the attributes of the current canonical feature codification that define the spatial separation between the canonical feature label and canonical feature data (e.g. the DX and DY attributes). Specifically, the document text rectangle dataset is searched to see if it defines any text rectangles with X/Y coordinates matching the X/Y coordinates of the potential label plus the X/Y distances recorded in the current canonical feature codification. For example, any text rectangles where:

(X1>=(XT.L+DX+tolerance)) AND (X2<=(XB.L+DX+tolerance)) AND
(Y1>=(YT.L+DY+tolerance)) AND (Y2<=(YB.L+DY+tolerance)) AND
(Font Size==FS.L) AND
(Data Type belongs to the set of possible data types generated at 706) AND
[other attribute checks]

Once again, a tolerance (e.g. 4 pixels) may be used in this determination. Similarly, additional (or fewer) attributes may be taken into account, such as font weight and/or other attributes.

If any text rectangles in the working document are identified, a preliminary association is recorded between the identifier of the current canonical feature (along with an indication that it is the data of that canonical feature) and the identified text rectangle(s). Once again, the preliminary association indicates that the text rectangle in question is potentially the identified canonical feature. An example of this is provided in Table H below, in which the canonical feature identifier '2.D' (indicating the data element of the invoice issue date feature) is associated with the text rectangle with identifier 'ccccccc':

TABLE H

Text rectangle/canonical feature
association data structure

| Text rectangle identifier | Canonical feature identifier(s) |
|---|---|
| Aaaaaaa | 2.L |
| Bbbbbbb | 2.L |
| Ccccccc | 2.D |

If multiple text rectangles matching the label element were identified at 722 (and associated therewith at 724), 726 is performed for each matching text rectangle.

Processing step 728 also involves an attempt to identify text rectangles in the working document that could correspond to the data element of the current canonical feature. At 728, however, this determination is based on the data element coordinates from the current canonical feature codification (e.g. the XT.D, YT.D, XB.D and YB.D attribute values). This determination is similar to the determination made at 722. For example, a text rectangle may be considered a match if:

(X1>=(XT.D+tolerance)) AND (X2<=(XB.D+tolerance)) AND
(Y1>=(YT.D+tolerance)) AND (Y2<=(YB.D+tolerance)) AND
(Font Size==FS.D) AND
(Font Weight==FW.D) AND
(Data Type belongs to the set of possible data types generated at 706) AND
[other attribute checks]

Once again, a tolerance (e.g. 4 pixels) may be used in this determination, and/or additional (or fewer) attributes may be taken into account.

In certain embodiments, attempting to identify text rectangles in the working document that could correspond to canonical feature data or label elements (e.g. at 728) may take into account the possibility of different text alignments (e.g. left justification, centered, and right justification). This can be done, for example, as follows:

Left Justification Text Rectangle Identification—Text Rectangles where:
(absolute_value (X1−XT.D)<tolerance) AND
(absolute_value (Y1−YT.D)<tolerance) AND
[other attribute checks, e.g. font size, font weight, data type, and/or others]

Right Justification Text Rectangle Identification—Text Rectangles where:
(absolute_value (X2−XB.D)<tolerance) AND
(absolute_value (Y2−YB.D)<tolerance) AND
[other attribute checks, e.g. font size, font weight, data type, and/or others]

Centered Text Rectangle Identification—Text Rectangles where:
(absolute_value (CenterX−CX.D)<tolerance) AND
(absolute_value (CenterY−CY.D)<tolerance) AND
[other attribute checks, e.g. font size, font weight, data type, and/or others]

In the above, CenterX and CenterY may be values stored in the text rectangle dataset or may be calculated with reference to the X1/X2 and Y1/Y2 values.

All identified text rectangles can then be considered for further processing.

If one or more text rectangles matching the data element is/are identified at 728, a preliminary association is recorded between the identifier of the current canonical feature (along with an indication that it is the data element of that feature) and each matching text rectangle as described above.

Following 728 the process continues to 730. At 730, a determination is made as to whether there are further canonical codifications that need to be processed for the current canonical feature. If so, the process returns to 718 to select the next codification of the canonical feature to be processed.

If matching text rectangles are identified at 724, 726 or 728, preliminary associations between canonical feature identifiers and text rectangles (e.g. in a text rectangle/canonical association feature data structure as shown in Tables G and H) are recorded. At any of these steps it is possible that one or more canonical feature identifiers may already have a preliminary association with the identified text rectangle (from previous processing loops). Furthermore, the canonical feature identifier(s) already associated with the text rectangle may be for the same canonical feature or a different canonical feature. In either case, the new association is recorded by appending it to any existing associations rather than replacing them. Accordingly, over the course of process 700 a given text rectangle may have preliminary associations with multiple canonical feature identifiers (of the same and/or different types).

If, at 730, all canonical codifications from filtered set of canonical feature codifications have been processed, the process continues to 732 (FIG. 7A). In this case, processing of the working canonical feature (i.e. the canonical feature last selected at 702) is complete: each of the canonical feature codifications for that feature has been processed to see if text rectangles corresponding to the codifications exist in the working document.

At 732, a determination is made as to whether there are further canonical features that need to be processed. If so, the process returns to 702 to select the next canonical feature for processing.

If, at 730, all canonical features have been processed the process continues to 734. At 734, and as noted above, a number text rectangles in the working document will have been preliminarily associated with canonical feature identifiers (e.g. in a text rectangle/canonical feature association data structure). Not all text rectangles will necessarily have a preliminary association with a canonical feature and some text rectangles may have a preliminary association with multiple canonical features. Table I provides an example of this:

TABLE I

Text rectangle/canonical feature
association data structure

| Text rectangle identifier | Canonical feature identifier(s) |
|---|---|
| aaaaaaa | 2.L, 2.L, 2.L, 3.D |
| bbbbbbb | 2.D, 2.D, 2.D |
| ccccccc | [none] |
| dddddd | 4.D, 5.L, 5.L, 4.D, 5.L |
| . . . | . . . |

At 734, each text rectangle that has been preliminarily associated with one or more canonical feature identifiers is processed in order to assign it a single, final canonical feature identifier. Specifically, a text rectangle is assigned the most frequently occurring canonical feature identifier. This assignment is made even if the most frequently occurring canonical feature identifier differs from the canonical feature that was autosuggested for the text rectangle in the initial processing at 506. In this way, the accuracy of feature identification is improved. Furthermore, canonical features may be determined for text rectangles that were not associated with any canonical feature in the initial document processing/auto-suggestion process of 506. In this way, additional document features are identified. Table J illustrates the text rectangle/canonical feature association data structure of Table I following this process. As can be seen in Table J, each text rectangle identifier is now associated with a single canonical feature identifier.

TABLE J

Final text rectangle/canonical feature
association data structure

| Text rectangle identifier | Canonical feature identifier |
|---|---|
| aaaaaaa | 2.L |
| bbbbbbb | 2.D |
| ccccccc | [none] |
| dddddd | 5.L |
| . . . | . . . |

In the unlikely event that a particular text rectangle is equally associated with more than one canonical feature tie-break logic may be applied. For example, the tie-break logic may define that such a text rectangle is to be finally associated with the most frequent canonical feature that is identified first (i.e. the canonical feature identifier associated with a text rectangle will only be updated if a new canonical feature identifier occurs more often). Alternatively, the tie-break logic may define that such a text rectangle is to be finally associated with the most frequent canonical feature that is identified last (i.e. the canonical feature identifier associated with a text rectangle will be updated if a new canonical feature identifier occurs at least as often).

At 736, the final text rectangle/canonical identifier associations determined at 734 are used to extract desired data from the document. For each desired data element (identified according to the canonical feature identifier) this involves finding the associated text rectangle identifier and looking up the data value of that text rectangle from the document text rectangle dataset (e.g. as shown in Table D above).

Optionally (and not shown), the final text rectangle/canonical identifier associations determined at 734 may also be used to update the codification of the working document so that codification can be saved in the reference set of document codification (and used in later processing of new documents).

Processes 500, 600, and 700 as illustrated in the Figures and described above are computer implemented processes. In order to perform the processing described with respect to processes 500, 600, and 700, a computer system (such as system 900 described below) stores or has access to computer programs/software (e.g. instructions and data) which, when executed by the processor 904, configure the system 900 to perform the operations described. In some cases processes 500, 600, and 700 will be performed by a single computer system, while in other cases the processes may be performed by multiple networked computer systems operating together.

Processes 500, 600, and 700 define steps in particular orders to explain various features. In certain cases, the steps may be able to be performed in a different order, one or more steps may be combined into a single step, a single step may be divided into multiple separate steps, and/or the function(s) achieved by one or more described/illustrated steps may be achieved by one or more alternative steps.

Hardware

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
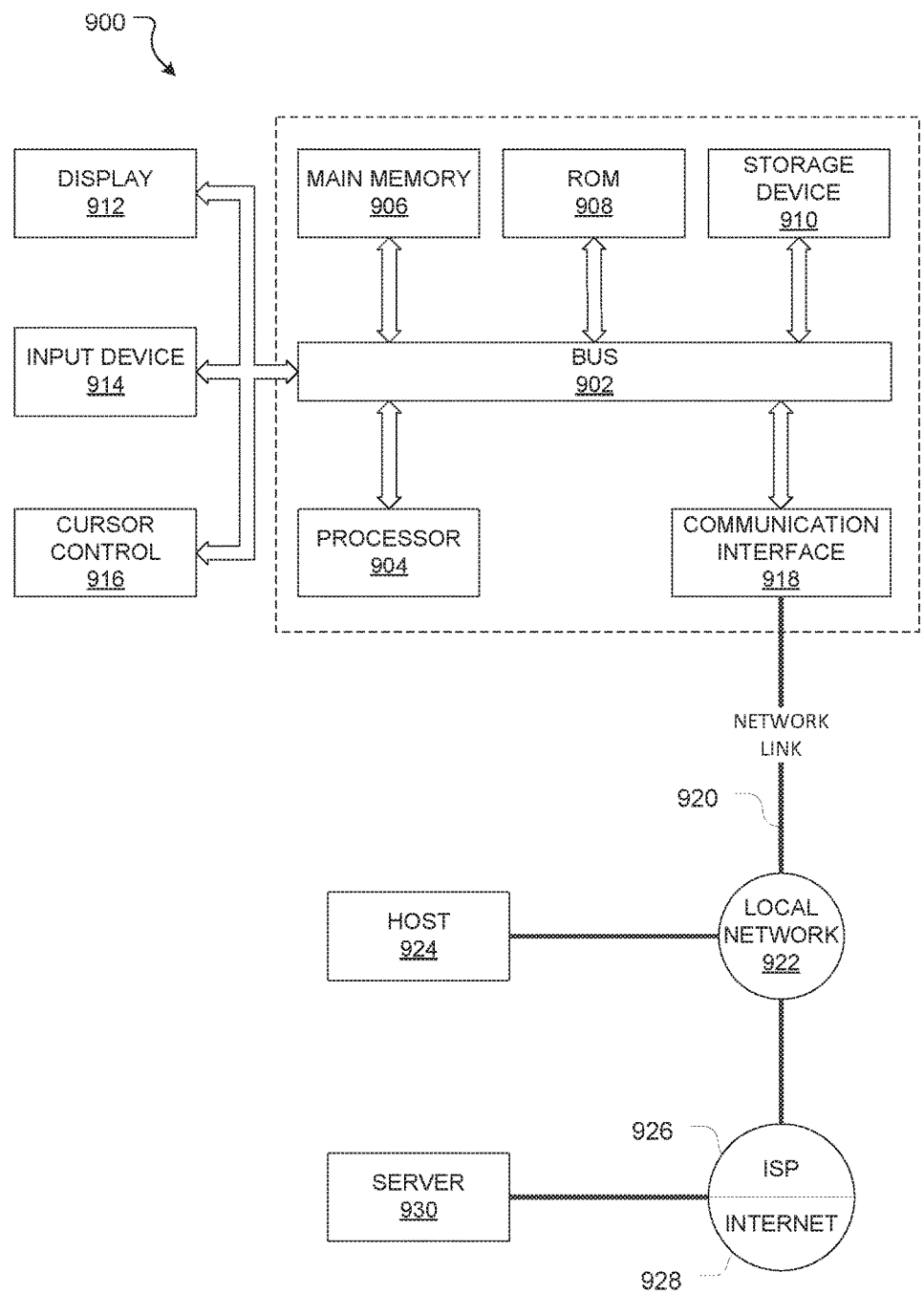
FIG. 9 illustrates a computer system which may be used to implement various features and embodiments described herein.

For example, FIG. 9 is a block diagram that illustrates a computer system 900 upon which an embodiment of the invention may be implemented. Server computer 102 and/or user computer 112 may be computer systems such as 900.

Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to one more output devices such as a display 912 for displaying information to a computer user. Display 912 may, for example, be a cathode ray tube (CRT), a liquid crystal display (LCD), a light emitting diode (LED display), or a touch screen display. An input device 914, including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Additional and/or alternative input devices are possible, for example touch screen displays.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

A computer system as described herein may be configured in a plurality of useful arrangements. In one approach, a data processing method comprises operating a computer to obtain from one or more non-transitory computer-readable data storage media a copy of one or more sequences of instructions that are stored on the media and which when executed by the computer cause the computer to perform the techniques that are described herein.

A computer system may take a variety of forms, for example a server computer, a desktop computer, a laptop computer, a notebook computer, a tablet computer, a smart phone, or other computer.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

It will be understood that the embodiments disclosed and defined in this specification extend to all alternative combinations of two or more of the individual features mentioned or evident from the text or drawings. All of these different combinations constitute various alternative aspects of the embodiments.

What is claimed is:

1. A computer implemented method for processing an electronic document, the method comprising:
   receiving the electronic document;
   generating an initial codification of the electronic document, the initial codification of the electronic document comprising a plurality of canonical feature codifications, each canonical feature codification comprising a plurality of attribute values describing attributes of the canonical feature as it appears in the electronic document;
   accessing a reference set of reference document codifications;
   for each reference document codification in the reference set, determining a similarity between the reference document codification and the initial codification of the electronic document;
   generating a comparison set of reference document codifications by including at most a threshold number of reference document codifications that are determined to be the most similar to the initial codification of the electronic document,
   each reference document codification in the comparison set comprising a plurality of canonical feature codifications, each canonical feature codification comprising a plurality of attribute values describing a position of the canonical feature in the reference document;
   processing each canonical feature codification in each reference document codification in the comparison set by:
      determining whether the electronic document has one or more text rectangles in a potential position of the canonical feature, the potential position of the canonical feature defined with reference to the attribute values of the canonical feature in the canonical feature codification; and
      in response determining that the electronic document has one or more text rectangles in a potential position of the canonical feature, recording a preliminary association between the text rectangle and the canonical feature; and
   for each text rectangle preliminarily associated with one or more canonical features, determining a final canonical feature assignment for the text rectangle, the final canonical feature assignment being determined based on the one or more canonical features preliminarily associated with the text rectangle.

2. The computer implemented method according to claim 1, wherein:
   determining a similarity between a given reference document codification and the initial codification of the electronic document comprises processing the given reference document codification and the initial codification of the electronic document to calculate a similarity measure in respect of the given reference document; and
   generating the comparison set comprises including at most the threshold number of reference document codifications with the highest similarity measure.

3. The computer implemented method according to claim 2, wherein the similarity measure is calculated based on comparing corresponding pairs of attribute values in the given reference document codification and the initial codification of the electronic document.

4. The computer implemented method according to claim 1, further comprising:
  processing the electronic document to identify text rectangles therein; and
  generating a text rectangle dataset for the electronic document, the text rectangle dataset storing text rectangle details in respect of each identified text rectangle, the text rectangle details for a given text rectangle comprising positional details defining a position of the text rectangle in the electronic document;
and wherein:
  determining whether the electronic document has one or more text rectangles in a potential position of the canonical feature comprises searching the text rectangle data set.

5. The computer implemented method according to according to claim 1, wherein the plurality of attribute values describing a given canonical feature comprise one or more attribute values selected from a group comprising: a font style attribute value, a font size attribute value, a font weight attribute value, and a data type attribute value.

6. The computer implemented method according to claim 1, wherein reference document codifications are generated in accordance with a document codification template, the document codification template defining an order of document features and attributes of those features.

7. The computer implemented method according to claim 6, wherein the document features defined by the codification template comprise the plurality of canonical features and a document-level feature.

8. The computer implemented method according to claim 7, wherein attributes of the document-level feature comprise one or more attribute values selected from a group comprising: a document density, a partial document density, a document height, a document width, and a document zero point.

9. The computer implemented method according to claim 1, further comprising extracting data in respect of at least one canonical feature from the electronic document by:
  identifying a text rectangle with a final canonical feature assignment; and
  extracting the text from the identified text rectangle as the canonical feature assigned to that text rectangle.

10. A system for processing an electronic document, the system comprising:
  one or more processors;
  one or more non-transitory computer-readable storage media storing sequences of instructions which, when executed by the one or more processors, cause the one or more processors to:
    receive the electronic document;
    generating an initial codification of the electronic document, the initial codification of the electronic document comprising a plurality of canonical feature codifications, each canonical feature codification comprising a plurality of attribute values describing attributes of the canonical feature as it appears in the electronic document;
    accessing a reference set of reference document codifications;
    for each reference document codification in the reference set, determining a similarity between the reference document codification and the initial codification of the electronic document;
    generating a comparison set of reference document codifications by including at most a threshold number of reference document codifications that are determined to be the most similar to the initial codification of the electronic document,
    each reference document codification in the comparison set comprising a plurality of canonical feature codifications, each canonical feature codification comprising a plurality of attribute values describing a position of the canonical feature in the reference document;
    process each canonical feature codification in each reference document codification in the comparison set by:
      determining whether the electronic document has one or more text rectangles in a potential position of the canonical feature, the potential position of the canonical feature defined with reference to the attribute values of the canonical feature in the canonical feature codification; and
      in response determining that the electronic document has one or more text rectangles in a potential position of the canonical feature, recording a preliminary association between the text rectangle and the canonical feature; and
    for each text rectangle preliminarily associated with one or more canonical features, determine a final canonical feature assignment for the text rectangle, the final canonical feature assignment being determined based on the one or more canonical features preliminarily associated with the text rectangle.

11. The system according to claim 10, wherein:
  determining a similarity between a given reference document codification and the initial codification of the electronic document comprises processing the given reference document codification and the initial codification of the electronic document to calculate a similarity measure in respect of the given reference document; and
  generating the comparison set comprises including at most the threshold number of reference document codifications with the highest similarity measure.

12. The system according to claim 11, wherein the similarity measure is calculated based on comparing corresponding pairs of attribute values in the given reference document codification and the initial codification of the electronic document.

13. The system according to claim 10, wherein when executed, the sequences of instructions further cause the one or more processors to:
  process the electronic document to identify text rectangles therein; and
  generate a text rectangle dataset for the electronic document, the text rectangle dataset storing text rectangle details in respect of each identified text rectangle, the text rectangle details for a given text rectangle comprising positional details defining a position of the text rectangle in the electronic document; and
wherein:
  determining whether the electronic document has one or more text rectangles in a potential position of the canonical feature comprises searching the text rectangle data set.

14. The system according to according to claim 10, wherein the plurality of attribute values describing a given canonical feature comprise one or more attribute values selected from a group comprising: a font style attribute value, a font size attribute value, a font weight attribute value, and a data type attribute value.

15. The system according to claim 10, wherein reference document codifications are generated in accordance with a document codification template, the document codification template defining an order of document features and attributes of those features.

16. The system according to claim 15, wherein the document features defined by the codification template comprise the plurality of canonical features and a document-level feature.

17. The system according to claim 16, wherein attributes of the document-level feature comprise one or more attribute values selected from a group comprising: a document density, a partial document density, a document height, a document width, and a document zero point.

18. The system according to claim 10, wherein when executed, the sequences of instructions further cause the one or more processors to extract data in respect of at least one canonical feature from the electronic document by:
    identifying a text rectangle with a final canonical feature assignment; and
    extracting the text from the identified text rectangle as the canonical feature assigned to that text rectangle.

* * * * *